(12) United States Patent
Mitchell et al.

(10) Patent No.: US 11,157,547 B2
(45) Date of Patent: Oct. 26, 2021

(54) IMAGE BASED TARGET ANALYSIS

(71) Applicant: Ent. Services Development Corporation LP, Houston, TX (US)

(72) Inventors: Guy Mitchell, Aurora, CO (US); Babak Makkinejad, Troy, MI (US)

(73) Assignee: Ent. Services Development Corporation LP, Houston, TX (US)

( * ) Notice: Subject to any disclaimer, the term of this patent is extended or adjusted under 35 U.S.C. 154(b) by 865 days.

(21) Appl. No.: 15/445,564

(22) Filed: Feb. 28, 2017

(65) Prior Publication Data

US 2018/0246910 A1 Aug. 30, 2018

(51) Int. Cl.
*G06F 16/583* (2019.01)
*G06F 16/532* (2019.01)
*G06K 9/62* (2006.01)
*G06K 9/00* (2006.01)
*G06F 16/432* (2019.01)
*G06F 16/50* (2019.01)

(52) U.S. Cl.
CPC .......... *G06F 16/532* (2019.01); *G06F 16/434* (2019.01); *G06K 9/00677* (2013.01); *G06K 9/6215* (2013.01); *G06F 16/50* (2019.01); *G06F 16/583* (2019.01); *G06K 2209/27* (2013.01)

(58) Field of Classification Search
CPC ...... G06F 16/532; G06F 16/58; G06F 16/434; G06F 16/583; G06F 16/5846; G06F 16/5854; G06F 16/5838; G06K 9/00677; G06K 9/6215; G06K 2209/27
See application file for complete search history.

(56) References Cited

U.S. PATENT DOCUMENTS

| 7,593,602 | B2 | 9/2009 | Stentiford | |
|---|---|---|---|---|
| 8,909,618 | B1 * | 12/2014 | Bushman | G06Q 30/0601 707/711 |
| 9,336,442 | B2 | 5/2016 | Cok | |
| 2007/0047781 | A1 * | 3/2007 | Hull | G06K 9/00442 382/124 |
| 2010/0287213 | A1 * | 11/2010 | Rolls | G16H 10/60 707/803 |
| 2013/0325981 | A1 * | 12/2013 | Hauke | G06Q 10/10 709/206 |

(Continued)

FOREIGN PATENT DOCUMENTS

JP  2011221844 A  11/2011

OTHER PUBLICATIONS

Suvanaphen, E.; the Visualization of Evolving Searches; https://kar.kent.ac.uk/24026/1/EvolvingEdward.pdf; Dec. 2006.

(Continued)

*Primary Examiner* — Vaishali Shah
(74) *Attorney, Agent, or Firm* — Polsinelli PC

(57) ABSTRACT

In some examples, image based target analysis may include performing a search to identify an image, and determining whether a target is present in the image, and image metadata. Image based target analysis may further include performing, in response to a determination that the target is present in the image, based on a relationship of the target to an entity, and the image metadata, a further search to identify another image, and generating, based on the image and/or the other image, a result indicative of further information on the target.

15 Claims, 4 Drawing Sheets

(56) References Cited

U.S. PATENT DOCUMENTS

2014/0314391 A1* 10/2014 Kim .................. G11B 27/11
                                                    386/248
2015/0066941 A1   3/2015 Martin
2017/0109609 A1*  4/2017 Hill .................. G06Q 30/00
2018/0035074 A1*  2/2018 Barnes, Jr. ............ H04N 5/765

OTHER PUBLICATIONS

Williamson, J. et al.; Flutter: Directed Random Browsing of Photo Collections with a Tangible Interface; http://dl.acm.org/ft_gateway.cfm?id=1394461&ftid=532477&dwn=1&CFID=691716295&CFTOKEN=63790195; Feb. 25-27, 2008.

* cited by examiner

300

```
┌─────────────────────────────────────────────────────────────┐
│ PERFORM AN AGE-REGRESSION OR AGE-PROGRESSION ON AN INPUT    │
│      IMAGE OF A TARGET TO A SPECIFIED AGE OF THE TARGET     │
│                            302                              │
└─────────────────────────────────────────────────────────────┘
                              ↓
┌─────────────────────────────────────────────────────────────┐
│   PERFORM, BASED ON THE AGE-REGRESSED OR AGE-PROGRESSED     │
│    INPUT IMAGE, A SEARCH OF A DATABASE TO IDENTIFY A FURTHER│
│                            IMAGE                            │
│                            304                              │
└─────────────────────────────────────────────────────────────┘
                              ↓
┌─────────────────────────────────────────────────────────────┐
│    PERFORM THE AGE-REGRESSION OR AGE-PROGRESSION ON THE     │
│      FURTHER IMAGE TO THE SPECIFIED AGE OF THE TARGET       │
│                            306                              │
└─────────────────────────────────────────────────────────────┘
                              ↓
┌─────────────────────────────────────────────────────────────┐
│ DETERMINE WHETHER THE TARGET IS PRESENT IN THE AGE-REGRESSED│
│             OR AGE-PROGRESSED FURTHER IMAGEE                │
│                            308                              │
└─────────────────────────────────────────────────────────────┘
                              ↓
┌─────────────────────────────────────────────────────────────┐
│  DETERMINE FURTHER IMAGE METADATA ASSOCIATED WITH THE AGE-  │
│          REGRESSED OR AGE-PROGRESSED FURTHER IMAGE          │
│                            310                              │
└─────────────────────────────────────────────────────────────┘
                              ↓
┌─────────────────────────────────────────────────────────────┐
│ PERFORM, IN RESPONSE TO A DETERMINATION THAT THE TARGET IS  │
│ PRESENT IN THE AGE-REGRESSED OR AGE-PROGRESSED FURTHER      │
│ IMAGE, BASED ON A RELATIONSHIP OF THE TARGET TO AN ENTITY, AND│
│   THE FURTHER IMAGE METADATA, A FURTHER SEARCH OF THE       │
│  DATABASE OR ANOTHER DATABASE TO IDENTIFY ANOTHER IMAGE     │
│                            312                              │
└─────────────────────────────────────────────────────────────┘
                              ↓
┌─────────────────────────────────────────────────────────────┐
│      GENERATE, BASED ON THE AGE-REGRESSED OR AGE-           │
│  PROGRESSED FURTHER IMAGE AND/OR THE AGE-REGRESSED OR       │
│   AGE-PROGRESSED OTHER IMAGE, A RESULT INDICATIVE OF        │
│           FURTHER INFORMATION ON THE TARGET                 │
│                            314                              │
└─────────────────────────────────────────────────────────────┘
```

FIG. 3

IMAGE BASED TARGET ANALYSIS

BACKGROUND

A search tool may be used to identify a target, such as, a person of interest, based on information including the person's name, occupation, gender, etc. For example, a user of a search tool may enter a person's name, occupation, gender, etc., into the search tool, and receive search results that include articles, census information, address, age, etc., that are retrieved by the search tool.

BRIEF DESCRIPTION OF DRAWINGS

Features of the present disclosure are illustrated by way of example and not limited in the following figure(s), in which like numerals indicate like elements, in which:

FIG. 3 illustrates a flowchart of an example method for image based target analysis.

DETAILED DESCRIPTION

Figure 1:
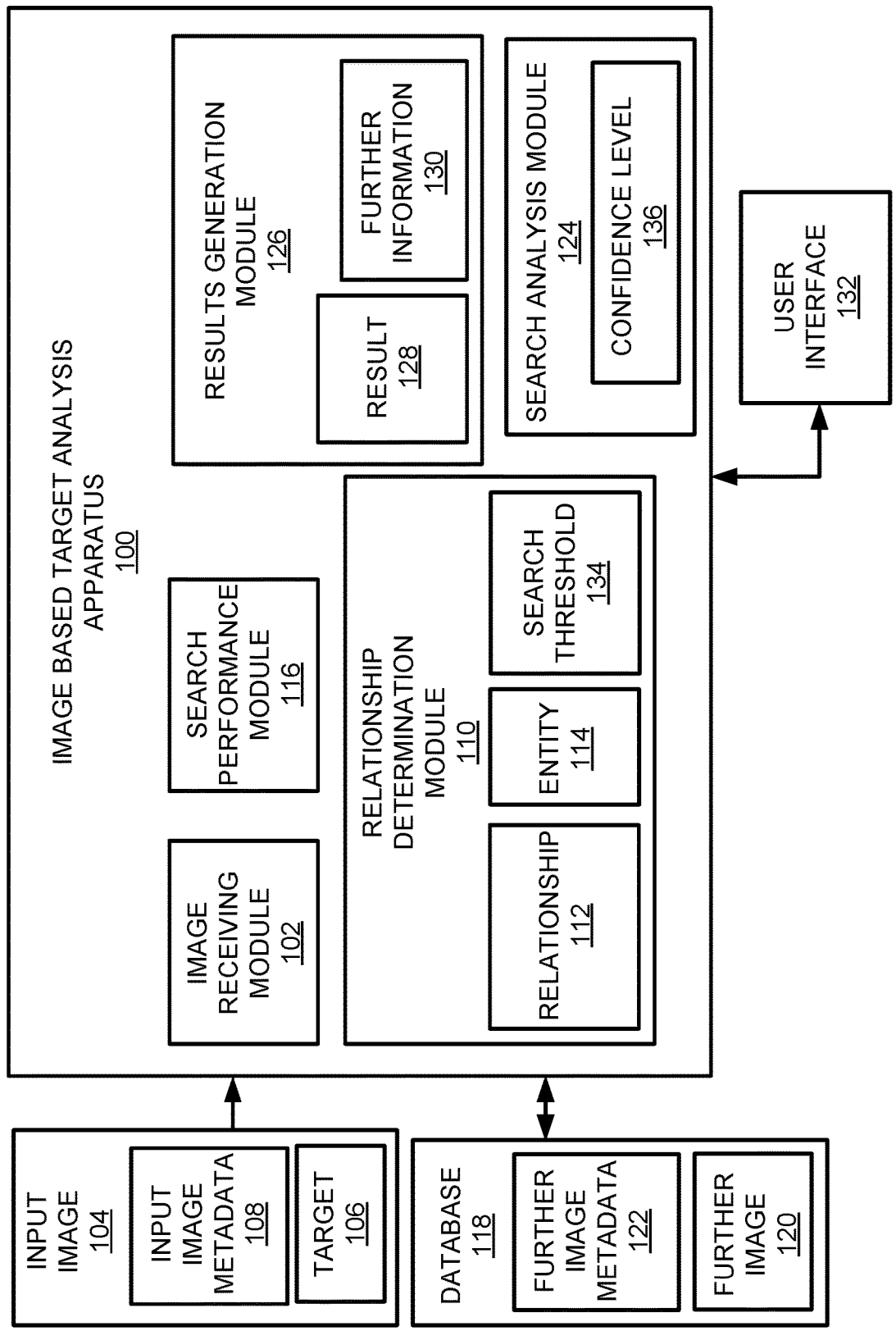
FIG. 1 illustrates an example layout of an image based target analysis apparatus.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

An image based target analysis apparatus, a method for image based target analysis, and a non-transitory computer readable medium having stored thereon machine readable instructions to provide image based target analysis are disclosed herein. The apparatus, method, and non-transitory computer readable medium disclosed herein provide for expansion of a search for images related to a target based on an input image of the target.

With respect to a search for images related to a target, such as a person, a search may be performed by entering keywords such as the target's name and other information such as the target's age, occupation, etc. Unless the images are already tagged by metadata that includes the searched keywords, such images may not be identified as part of the search for the images related to the target.

In order to address these technical challenges with respect to a search for images related to a target, the apparatus, method, and non-transitory computer readable medium disclosed herein provide for expansion of a search for images related to a target based on an input image of the target, without the need for the resulting images to rely on metadata that includes the searched keywords.

According to an example, for the apparatus, method, and non-transitory computer readable medium disclosed herein, image based target analysis as disclosed herein may include ascertaining an input image of a target that is to be analyzed and input image metadata associated with the input image. The target as disclosed herein may include, for example, a person, or another object that is the subject to the search. A relationship of the target to an entity may be ascertained to constrain a search associated with the input image of the target. The relationship as disclosed herein may include, for example, a kinship relationship, a membership relationship, a friend relationship, a locale relationship, an ethnicity relationship, a date relationship, a weather relationship, a work relationship, and other such relationships of the target to the entity. The entity as disclosed herein may include the subject of the relationship. For example, for a kinship relationship that includes an uncle, the entity may include the selection of uncle, and the name of the uncle.

According to another example, for a membership relationship, the entity may include a sports team for which the target is a part of. Image based target analysis as disclosed herein may further include performing, based on the input image and the input image metadata, a search of a database to identify a further image, and determining, based on an analysis of the further image, whether the target is present in the further image, and further image metadata associated with the further image. For example, the further image may be determined based on the input image and the input image metadata, without the need to rely on metadata that includes searched keywords. Further, image based target analysis as disclosed herein may further include performing, in response to a determination that the target is present in the further image, based on the relationship of the target to the entity, and the further image metadata, a further search of the database or another database to identify another image, and generating, based on the further image and/or the other image, a result indicative of further information on the target. For example, the further information may include information with respect to the further image and/or the other image (e.g., the further image is of the target's sports team and includes the target in the far right, and the other image is of the target's high school and includes the target in a group image).

For the apparatus, method, and non-transitory computer readable medium disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates an example layout of an image based target analysis apparatus (hereinafter also referred to as "apparatus 100").

Referring to FIG. 1, the apparatus 100 may include an image receiving module 102 to ascertain an input image 104 of a target 106 that is to be analyzed, and input image metadata 108 associated with the input image 104. For example, in order to initiate a search associated with the target 106 as disclosed herein, the search may be initiated by a user supplying the target's image (e.g., the input image 104), and/or the target's image and metadata such as the target's name, location, etc. The input image 104 (or the input image 104 and input image metadata 108) may represent an initial seed (or seeds) to begin the search related to the target 106.

A relationship determination module 110 is to ascertain a relationship 112 of the target 106 to an entity 114 to constrain a search associated with the input image 104 of the target 106.

A search performance module 116 is to perform, based on the input image 104 and the input image metadata 108, a search of a database 118 to identify a further image 120 (i.e., a further seed or seeds as disclosed herein). The database 118 may include textual and/or image databases. The further image 120 may include further image metadata 122.

A search analysis module 124 is to determine, based on an analysis of the further image 120, whether the target 106 is present in the further image 120, and the further image metadata 122 associated with the further image 120.

The search performance module 116 is to perform, in response to a determination that the target 106 is present in the further image 120, based on the relationship 112 of the target 106 to the entity 114, and the further image metadata 122, a further search of the database or another database to identify another image. The other image may represent another seed or seeds as disclosed herein. In this manner, the search performance module 116 may perform further searches on further identified images (which would be designated as yet further seed or seeds) until a search threshold is reached as disclosed herein.

A results generation module 126 is to generate, based on the further image 120 and the other image (and any yet further images), a result 128 indicative of further information 130 on the target 106.

Elements of the apparatus 100 are described in further detail with respect to FIG. 1.

As disclosed herein, the relationship determination module 110 is to ascertain the relationship 112 of the target 106 to the entity 114 to constrain the search associated with the input image 104 of the target 106. In this regard, the relationship 112 may represent a finite collection of user-selected (and/or user defined) relations that constrain the search and prevent the search from degenerating into a random-walk in the search space. The relationship 112 may include, for example, a kinship relationship, a membership relationship, a friend relationship, a locale relationship, an ethnicity relationship, a date relationship, a weather relationship, and/or a work relationship of the target 106 to the entity 114, and other types of relationships. Each relationship 112 may include differentiating sub-relations. For example, the kinship relationship may include sub-relations such as parents, siblings, children, grandchildren, aunts, uncles, spouses, cousins, step-relationships, grand-parents, great grandchildren, great grand-parents, etc. The membership relationship may include sub-relations such as sports teams, civic organizations, professional organization, businesses, government agencies (local, state, federal), religious affiliation, etc. The locale relationship may include sub-relations such as city, state, country, continent, etc. The date relationship may include sub-relations such as start date of the search (e.g., finding an image from this date forward until the end date), end date of the search (e.g., finding an image from the start date until this date), etc. The weather relationship may include the season of the year, the weather conditions such as rainy, sunny, stormy, warm, cold, freezing, hot, etc.

The relationship 112 (including the sub-relations) may be used in combination (e.g., as relationships) or individually, to constrain the search for images (as well as other documents, such as textual documents) by extracting potentially relevant images (e.g., the further image 120, and yet further images), as well as other documents, that satisfy one, many, or all of the relationships.

New relationships may also be defined, for example, by a user interface (UI) 132. For example, a user of the apparatus 100 may define new relationships or edit the existing relationship. The user interface 132 may also provide for selection of one or more of the existing relationships to be applied to a search.

The relationship 112 may include a plurality of relationships combined by Boolean logical operators that include AND, OR, XOR, and NOT. The AND represents a conjunction, OR represents a disjunction, XOR represents an exclusive OR, and NOT represents a negation. Additionally, combinations of relationships may be combined by the Boolean logical operators.

For each relationship 112, a depth or search threshold 134 may be specified to constrain the search for identifying matches. For example, in the kinship relationship search, a user may specify the degree of closeness, forwards and backwards, to specify, for example, searching for a great grandparent or for great grandchildren, where the degrees of closeness may be specified as "−3" and "3", respectively. Likewise for other relationships such as friend relationship, a degree of friendship may be specified such as friend, friend of friend, friend of friend of friend, respectively corresponding to degrees of friendship 1, 2, 3. In this case, the degree may be positive, and the user interface 132 may enable a user to limit the degree for the search.

A search threshold 134 as disclosed may also constrain a number of further images and/or documents (i.e., further seeds) that are analyzed. Thus, the search threshold 134 may be applied by the search performance module 116 to limit the search of the database 118 to identify the further image 120 (and yet further images, until the search threshold 134 is met).

As disclosed herein, the search performance module 116 is to perform, based on the input image 104 and the input image metadata 108, a search of the database 118 to identify the further image 120. With respect to the relationship 112, for different relationships, different databases of images and/or documents may be searched. For example, the database 118 may include municipal public repositories for demographics and kinship data. According to another example, the database 118 may include year books, annual reports, directories, etc., for work relationship searches, etc. The database 118 may also include overlap between data sources such as, for example, FACEBOOK™, LINKEDIN™, etc.

As disclosed herein, the search analysis module 124 is to determine, based on an analysis of the further image 120, whether the target 106 is present in the further image 120, and the further image metadata 122 associated with the further image 120. In this regard, the search performance module 116 is to determine, based on the analysis of the further image 120, whether another person is present in the further image 120, and the further image metadata 122 associated with the further image 120. Further, the search performance module 116 is to perform, in response to a determination that the other person is present in the further image 120, based on the relationship 112 of the target 106 to the entity 114, and the further image metadata 122, a yet further search of the database 118 or another database to identify yet another image.

As disclosed herein, the search analysis module 124 is to determine, based on an analysis of the further image 120, whether the target 106 is present in the further image 120, and the further image metadata 122 associated with the further image 120. In this regard, the search performance module 116 is to perform, in response to a determination that the target 106 is not present in the further image 120, based on the relationship 112 of the target 106 to the entity 114, and the further image metadata 122, a yet further search of the database 118 or the another database to identify yet another image (e.g., another seed beyond the further image 120). Further, the search analysis module 124 is to determine, based on an analysis of the yet other image, whether the target 106 is present in the other image, and yet other image metadata associated with the yet other image. The results generation module 126 is to generate, based on at least one of the further image 120 and the yet other image, the result indicative of further information 130 on the target 106.

For example, when a kinship relationship is selected, the search performance module 116 is to search public records of birth and death data for the degree of kinship relationship. The search performance module 116 may discover those images that satisfy that degree of kinship relationship, and extend the search to include those names and any images within which those persons are represented.

In the case of images returned from the secondary search above (e.g., the other image), in this case a kinship relationship, the search analysis module 124 is to determine if the original target 106 of the search is represented in those images and if so, return the images. If not, and if metadata in the image identifies who is represented, the search performance module 116 and the search analysis module 124 may use those names to extend the search and look for documents and images that represent those persons, and/or those persons identified via the kinship relationship, and/or the original target 106 who is being searched.

With respect to the images returned from the secondary search above (e.g., the other image), these images may be denoted as further seeds (and beyond). In this regard, the search performance module 116 is to search accessible repositories (e.g., the database 118 or another database) for matching images and/or documents to the further seeds (and beyond).

The search performance module 116 is to perform a search on images by matching metadata, if any, and/or by applying facial recognition techniques that use the input image 104 of the target 106. Examples of facial recognition techniques include techniques based on two-dimensional recognition, three-dimensional recognition, skin texture analysis, thermal imaging, etc.

As disclosed herein, the search analysis module 124 is to determine, based on an analysis of the further image 120, whether the target 106 is present in the further image 120, and the further image metadata 122 associated with the further image 120. In this regard, the search analysis module 124 may ascertain a confidence level 136 for matching the target 106 in the input image 104 to an object in the further image 120. The search analysis module 124 may determine, based on the analysis of the further image 120, whether a confidence of a match of the target 106 in the input image 104 to the object in the further image 120 is at or greater than the confidence level 136. Further, the search analysis module 124 may determine, in response to a determination that the confidence of the match of the target 106 in the input image 104 to the object in the further image 120 is at or greater than the confidence level 136, that the target 106 is present in the further image. In this manner, a user may supply a confidence level for the goodness of the image match, and the results generation module 126 may return those images that satisfy that confidence level 136.

With respect to the relationship 112, if a date relationship is specified, the relationship determination module 110 may perform an age-regression (or age-progression) on the input image 104 to a specified age of the target 106. In this regard, the relationship determination module 110 may ascertain the relationship 112 of the target 106 to the entity 114 to constrain the search associated with the age-regressed (or age-progressed) input image 104 of the target 106. The search performance module 116 may perform, based on the age-regressed (or age-progressed) input image and the input image metadata 108, the search of the database 118 to identify the further image 120. The relationship determination module 110 may perform the age-regression (or age-progression) on the further image 120 to the specified age of the target 106. The search analysis module 124 may determine, based on the analysis of the age-regressed further image, whether the target 106 is present in the age-regressed further image, and further image metadata 122 associated with the age-regressed further image. The search performance module 116 may perform, in response to the determination that the target 106 is present in the age-regressed further image, based on the relationship 112 of the target 106 to the entity 114, and the further image metadata 122, a further search of the database 118 or another database to identify another image. The results generation module 126 may generate, based on the age-regressed further image and/or the other image, the result 128 indicative of further information on the target 106.

The search analysis module 124 may perform a vetting of those images and/or documents that result from an initial search by applying the relationships (i.e., for the relationship 112) supplied by a user. In this regard, each relationship may be applied separately to the set of the returned images and/or documents. Depending on the combination of relationships using logical operators, the search analysis module 124 may return a set of images and/or documents satisfying the relationships with logical operators applied to the relationships.

Figure 2:
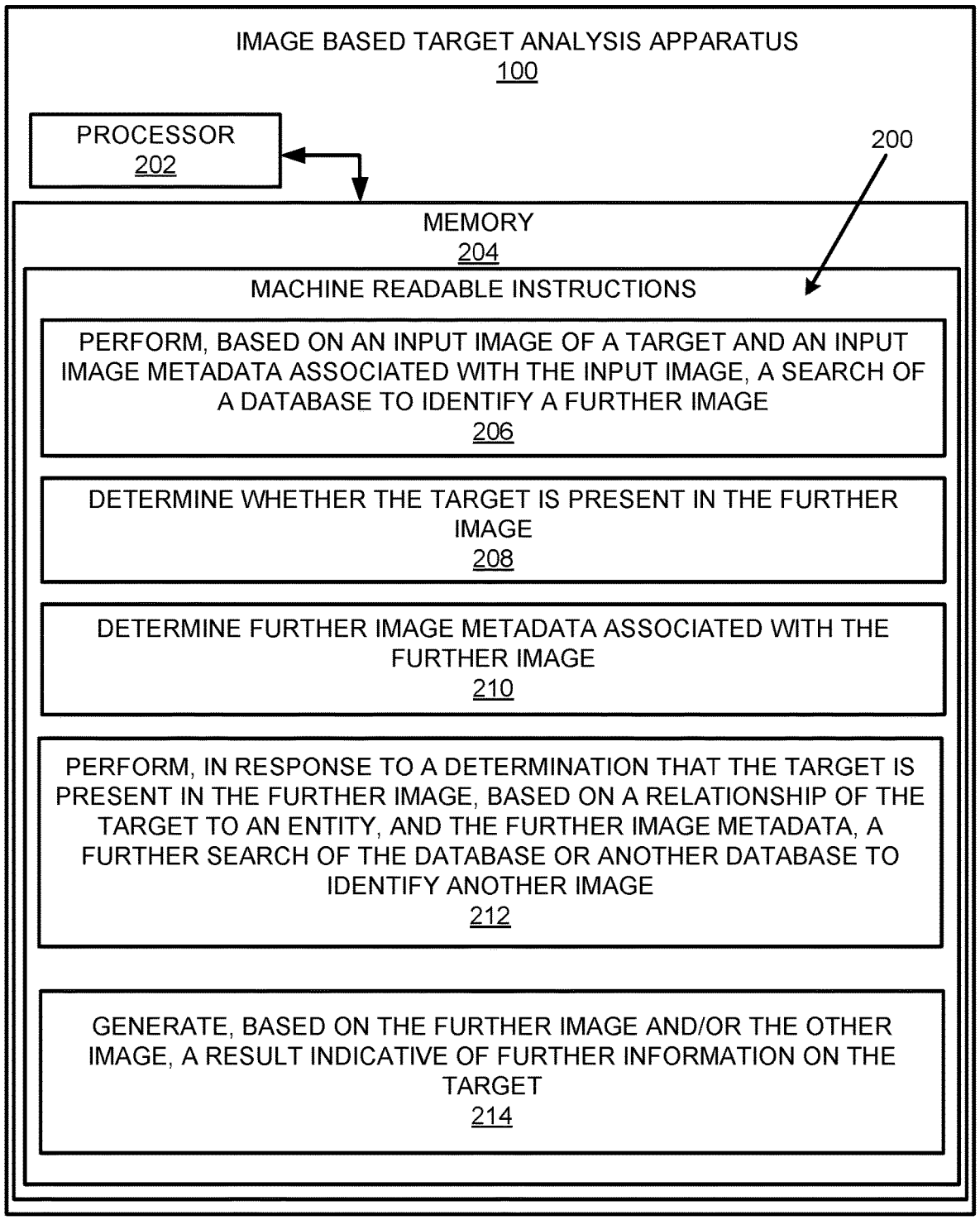
FIG. 2 illustrates an example block diagram for image based target analysis.
Figure 4:
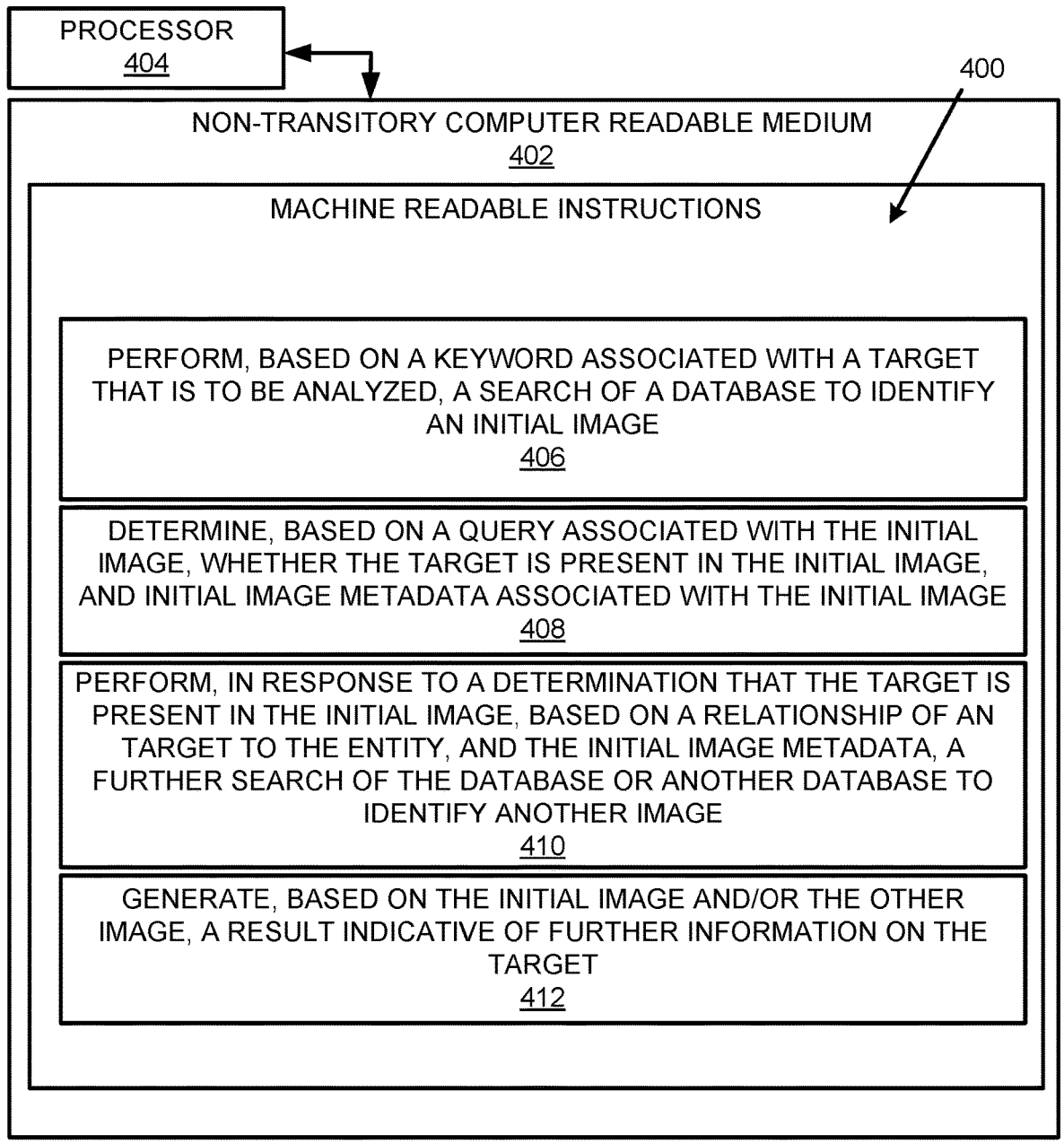
FIG. 4 illustrates a further example block diagram for image based target analysis.

FIGS. 2-4 respectively illustrate an example block diagram 200, a flowchart of an example method 300, and a further example block diagram 400 for image based target analysis, according to examples. The block diagram 200, the method 300, and the block diagram 400 may be implemented on the apparatus 100 described above with reference to FIG. 1 by way of example and not of limitation. The block diagram 200, the method 300, and the block diagram 400 may be practiced in other apparatus. In addition to showing the block diagram 200, FIG. 2 shows hardware of the apparatus 100 that may execute the instructions of the block diagram 200. The hardware may include a processor 202, and a memory 204 storing machine readable instructions that when executed by the processor cause the processor to perform the instructions of the block diagram 200. The memory 204 may represent a non-transitory computer readable medium. FIG. 3 may represent an example method for image based target analysis, and the steps of the method. FIG. 4 may represent a non-transitory computer readable medium 402 having stored thereon machine readable instructions to provide image based target analysis according to an example. The machine readable instructions, when executed, cause a processor 404 to perform the instructions of the block diagram 400 also shown in FIG. 4.

The processor 202 of FIG. 2 and/or the processor 404 of FIG. 4 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 402 of FIG. 4), such as hardware storage devices (e.g., RAM (random access memory), ROM (read only memory), EPROM (erasable, programmable ROM), EEPROM (electrically erasable, programmable ROM), hard drives, and flash memory). The memory 204 may include a RAM, where the machine readable instructions and data for a processor may reside during runtime.

Referring to FIGS. 1 and 2, and particularly to the block diagram 200 shown in FIG. 2, at block 206, the memory 204 may include instructions to perform, based on an input image 104 of a target 106 and an input image metadata 108 associated with the input image 104, a search of a database 118 to identify a further image 120.

At block 208, the memory 204 may include instructions to determine whether the target 106 is present in the further image 120.

At block 210, the memory 204 may include instructions to determine further image metadata 122 associated with the further image 120.

At block 212, the memory 204 may include instructions to perform, in response to a determination that the target 106 is present in the further image 120, based on a relationship 112 of the target 106 to an entity 114, and the further image metadata 122, a further search of the database 118 or another database to identify another image.

At block 214, the memory 204 may include instructions to generate, based on the further image 120 and/or the other image, a result 128 indicative of further information 130 on the target 106.

Referring to FIGS. 1 and 3, and particularly FIG. 3, for the method 300, at block 302, the method may include performing an age-regression or age-progression on an input image 104 of a target to a specified age of the target 106. Thus, compared to the example of FIG. 2, the image based target analysis may be based on the input image 104, without the associated input image metadata 108.

At block 304, the method may include performing, based on the age-regressed or age-progressed input image, a search of a database 118 to identify a further image 120.

At block 306, the method may include performing the age-regression or age-progression on the further image 120 to the specified age of the target 106.

At block 308, the method may include determining whether the target 106 is present in the age-regressed or age-progressed further image.

At block 310, the method may include determining further image metadata 122 associated with the age-regressed or age-progressed further image.

At block 312, the method may include performing, in response to a determination that the target 106 is present in the age-regressed or age-progressed further image, based on a relationship 112 of the target 106 to an entity 114, and the further image metadata 122, a further search of the database 118 or another database to identify another image.

At block 314, the method may include generating, based on the age-regressed or age-progressed further image and/or the age-regressed or age-progressed other image, a result 128 indicative of further information 130 on the target 106.

Referring to FIGS. 1 and 4, and particularly FIG. 4, for the block diagram 400, at block 406, the non-transitory computer readable medium 402 may include instructions to perform, based on a keyword associated with a target that is to be analyzed, a search of a database 118 to identify an initial image. The search of the database 118 may be limited based on a search threshold 134. Thus, compared to the examples of FIGS. 2 and 3, the image based target analysis may be based on a keyword associated with the target, without the associated input image 104. For example, the keyword may include the target's name, or additional information such as the target's location, month of birth, etc.

At block 408, the non-transitory computer readable medium 402 may include instructions to determine, based on a query associated with the initial image, whether the target 106 is present in the initial image, and initial image metadata associated with the initial image. For example, a user may be presented with a query to confirm whether the target 106 is present in the initial image.

At block 410, the non-transitory computer readable medium 402 may include instructions to perform, in response to a determination that the target 106 is present in the initial image, based on a relationship 112 of the target 106 to an entity 114, and the initial image metadata, a further search of the database 118 or another database to identify another image. The search of the other database 118 may be limited based on the search threshold 134.

At block 412, the non-transitory computer readable medium 402 may include instructions to generate, based on the initial image and/or the other image, a result 128 indicative of further information 130 on the target 106.

According to an example, the machine readable instructions to determine, based on the query associated with the initial image, whether the target 106 is present in the initial image, and initial image metadata associated with the initial image, and generate, based on at least one of the initial image and the other image, the result 128 indicative of further information on the target 106, when executed, may further cause the processor to perform, in response to a determination that the target 106 is not present in the initial image, based on the relationship 112 of the target 106 to the entity 114, and the initial image metadata, a yet further search of the database 118 or the another database to identify yet another image, determine, based on a query associated with the yet other image, whether the target 106 is present in the yet other image, and yet other image metadata associated with the yet other image, and generate, based on the initial image and/or the yet other image, the result 128 indicative of further information on the target 106.

According to an example, the machine readable instructions to determine, based on the query associated with the initial image, whether the target 106 is present in the initial image, and initial image metadata associated with the initial image, when executed, may further cause the processor to ascertain an input image of the target 106, ascertain a confidence level 136 for matching the target 106 in the input image to an object in the initial image, determine, based on an analysis of the initial image, whether a confidence of a match of the target 106 in the input image to the object in the initial image is at or greater than the confidence level 136, and determine, in response to a determination that the confidence of the match of the target 106 in the input image to the object in the initial image is at or greater than the confidence level 136, that the target 106 is present in the initial image.

According to an example, the machine readable instructions to determine, based on the query associated with the initial image, whether the target 106 is present in the initial image, and initial image metadata associated with the initial image, perform, in response to the determination that the target 106 is present in the initial image, based on the relationship 112 of the target 106 to the entity 114, and the initial image metadata, the further search of the database 118 or another database to identify another image, and generate, based on at least one of the initial image and the other image, the result 128 indicative of further information on the target 106, when executed, may further cause the processor to perform an age-regression on the initial image to a specified age of the target 106, determine, based on the query associated with the age-regressed initial image, whether the target 106 is present in the age-regressed initial image, and initial image metadata associated with the age-regressed initial image, perform, in response to the determination that the target 106 is present in the age-regressed initial image, based on the relationship 112 of the target 106 to the entity 114, and the initial image metadata, a further search of the database or another database to identify another image, and generate, based on the age-regressed initial image and/or the other image, a result 128 indicative of further information on the target 106.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a processor; and
   a memory storing machine readable instructions that when executed by the processor cause the processor to:
   provide an interface for a user to specify a target of a search and one or more relationships to constrain the search, wherein the one or more relationships include a kinship relationship and the kinship relationship includes a selection between: a forward degree of closeness specified as a positive number and a backward degree of closeness specified as a negative number, wherein the forward degree of closeness represents descendent generations and the backward degree of closeness represents ancestral generations;
   receive an input image of the target, an input image metadata associated with the input image, a specified age of the target, and the one or more relationships;
   age-regress or age-progress the input image of the target to the specified age of the target to produce an age-regressed input image or an age-progressed input image;
   perform, based on the age-regressed input image or the age-progressed input image and the input image metadata, a search of a database to identify a further image;
   determine whether the target and an entity that satisfies the one or more relationships are present in the further image;
   determine further image metadata associated with the further image;
   perform, in response to a determination that the target and the entity are present in the further image, a further search of the database or another database based on the entity and the further image metadata to identify another image; and
   search a database platform, based on at least one of the further image and the another image, to generate further information on the target.

2. The apparatus according to claim 1, wherein the target includes a person, and the machine readable instructions to determine whether the target and an entity that satisfies the one or more relationships are present in the further image further comprise machine readable instructions to cause the processor to:
   determine whether the entity satisfies the specified forward degree of closeness or the specified backward degree of closeness.

3. The apparatus according to claim 1,
   wherein the one or more relationships further include at least one of a membership relationship, a friend relationship, a locale relationship, an ethnicity relationship, a date relationship, a weather relationship, and a work relationship.

4. The apparatus according to claim 1, wherein the one or more relationships are combined by at least one Boolean logical operator that includes AND, OR, XOR, and NOT, wherein AND represents a conjunction, OR represents a disjunction, XOR represents an exclusive OR, and NOT represents a negation.

5. The apparatus according to claim 1, wherein the machine readable instructions, when executed by the processor, further cause the processor to:
   ascertain a search threshold;
   limit, based on the search threshold, the search of the database to identify the further image; and
   limit, based on the search threshold, the search of the database or the other database to identify the other image.

6. The apparatus according to claim 1, wherein the machine readable instructions further cause the processor to:
   perform, in response to a determination that the target is not present in the further image and the entity that satisfies the one or more relationships is present in the further image, a yet further search of the database or the another database based on the entity and the further image metadata to identify a yet other image;
   determine, based on an analysis of the yet other image, whether the target is present in the yet other image, and yet other image metadata associated with the yet other image; and
   generate, based on at least one of the further image and the yet other image, the result indicative of further information on the target.

7. The apparatus according to claim 1, wherein the machine readable instructions to determine whether the target and an entity that satisfies a relationship are present in the further image further comprise machine readable instructions to cause the processor to:
   ascertain a confidence level for matching the target in the input image to an object in the further image;
   determine, based on analysis of the further image, whether a confidence of a match of the target in the input image to the object in the further image is at or greater than the confidence level; and
   determine, in response to a determination that the confidence of the match of the target in the input image to the object in the further image is at or greater than the confidence level, that the target is present in the further image.

8. The apparatus according to claim 1, further comprising machine readable instructions to cause the processor to:
   constrain the search associated with the age-regressed or age-progressed input image based on the one or more relationships.

9. A method comprising:
   providing an interface for a user to specify a target of a search and one or more relationships to constrain the search, wherein the one or more relationships include a kinship relationship and the kinship relationship includes a selection between: a forward degree of closeness specified as a positive number and a backward degree of closeness specified as a negative number, wherein the forward degree of closeness represents descendent generations and the backward degree of closeness represents ancestral generations;
   receiving an input image of the target, an input image metadata associated with the input image, a specified age of the target, and the one or more relationships;
   performing an age-regression or age-progression on the input image of the target to the specified age of the target to produce an age-regressed input image or an age-progressed input image;
   performing, by a processor, based on the age-regressed input image or the age-progressed input image, a search of a database to identify a further image;
   determining whether the target and an entity that satisfies the one or more relationships are present in the further image;
   determining further image metadata associated with the further image;
   performing, in response to a determination that the target and the entity are present in the further image, a further search of the database or another database based on the entity and the further image metadata to identify another image; and
   search a database platform, based on at least one of the further image and the another image, to generate further information on the target.

10. The method according to claim 9,
    wherein the one or more relationships further include at least one of a membership relationship, a friend relationship, a locale relationship, an ethnicity relationship, a date relationship, a weather relationship, and a work relationship.

11. The method according to claim 9, wherein the one or more relationships are combined by at least one Boolean logical operator that includes AND, OR, XOR, and NOT, wherein AND represents a conjunction, OR represents a disjunction, XOR represents an exclusive OR, and NOT represents a negation.

12. A non-transitory computer readable medium having stored thereon machine readable instructions to provide image based target analysis, the machine readable instructions, when executed, cause a processor to:
    provide an interface for a user to specify a target of a search and one or more relationships to constrain the search, wherein the one or more relationships include a kinship relationship and the kinship relationship includes a selection between: a forward degree of closeness specified as a positive number and a backward degree of closeness specified as a negative number, wherein the forward degree of closeness represents descendent generations and the backward degree of closeness represents ancestral generations;
    receive an input image of the target, an input image metadata associated with the input image, a specified age of the target, and the one or more relationships;
    age-regress or age-progress the input image of the target to the specified age of the target to produce an age-regressed input image or an age-progressed input image;
    perform, based on the age-regressed input image or the age-progressed input image and the input image metadata, a search of a database to identify a further image;
    determine whether the target and an entity that satisfies the one or more relationships are present in the further image;
    determine further image metadata associated with the further image;
    perform, in response to a determination that the target and the entity are present in the further image, a further search of the database or another database based on the entity and the further image metadata to identify another image; and
    search a database platform, based on at least one of the further image and the another image, to generate further information on the target.

13. The non-transitory computer readable medium according to claim 12, wherein the machine readable instructions are further to cause the processor to:
    perform, in response to a determination that the target is not present in the further image and the entity that satisfies the one or more relationships is present in the further image, a yet further search of the database or the other database based on the entity and the further image metadata to identify a yet other image;
    determine, based on an analysis of the yet other image, whether the target is present in the yet other image, and yet other image metadata associated with the yet other image; and
    generate, based on at least one of the further image and the yet other image, the result indicative of further information on the target.

14. The non-transitory computer readable medium according to claim 12, wherein the machine readable instructions are further to cause the processor to:
    ascertain a confidence level for matching the target in the input image to an object in the further image;
    determine, based on an analysis of the further image, whether a confidence of a match of the target in the input image to the object in the further image is at or greater than the confidence level; and
    determine, in response to a determination that the confidence of the match of the target in the input image to the object in the further image is at or greater than the confidence level, that the target is present in the further image.

15. The non-transitory computer readable medium according to claim 12, wherein the one or more relationships further include at least one of a membership relationship, a friend relationship, a locale relationship, an ethnicity relationship, a date relationship, a weather relationship, and a work relationship of the target to the entity to constrain the search associated with the input image.

\* \* \* \* \*